United States Patent Office 3,317,575
Patented May 2, 1967

3,317,575
HETEROCYCLES HAVING IN THE RING THEREOF AN ELEMENT FROM GROUP V-A
Arthur W. Breindel, Yonkers, and Sheldon Herbstman, Bronx, N.Y., assignors to Stauffer Chemical Company, New York, N.Y., a corporation of Delaware
No Drawing. Filed Nov. 4, 1963, Ser. No. 321,319
14 Claims. (Cl. 260—440)

This invention relates to new and novel heterocyclic compounds. In particular, the invention is concerned with certain heterocyclic derivatives in which one of the hetero atoms is an element taken from Group V-A of the Periodic Table. This invention also pertains to a method of preparing the aforesaid heterocyclic derivatives.

In accordance with the present invention, it has been discovered that certain acid anhydrides as typified by carbon dioxide, carbon disulfide, carbon oxysulfide, isocyanates and the like are capable of reacting with organic oxides and sulfides of elements of Group V-A in the Periodic Table whereby there is formed a new family of heterocyclic compounds. The structure of these hitherto unknown chemical entities as far as we have been able to ascertain conforms to a heterocyclic ring system in which one of the hetero atoms is derived from the Group V-A element. The configuration of the compounds can be visualized by reference to the following general formula:

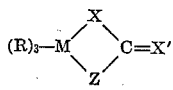

wherein M represents an element of Group V-A of the Periodic Table such as antimony or arsenic, R is an alkyl radical of from 1 to 10 carbon atoms, e.g. methyl, ethyl, isohexyl, n-butyl, isobutyl, n-pentyl, isohexyl, n-heptyl, isooctyl and aralkyl, such as benzyl and phenethyl. It is to be understood that R may have attached thereto such relatively inert groups as halogen, e.g. fluorine or chlorine, lower alkyl, lower alkoxyl and the like; X and X', which may be alike or different, are chalcogens as exemplified by oxygen and sulfur and Z can be a chalcogen as above for X and X' and >N—R' in which R' represents a hydrocarbon residue such as an alkyl radical of from 1 to 10 carbon atoms, an aromatic group such as phenyl or naphthyl, which may be optionally substituted by the relatively inert groups as above enunciated for R and

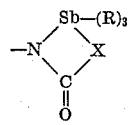

Individual compounds which are illustrative of the invention are formalistically depicted below.

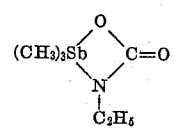 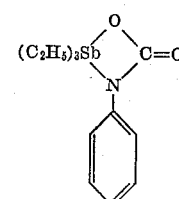

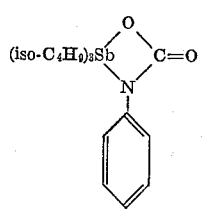 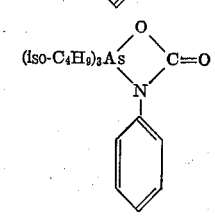

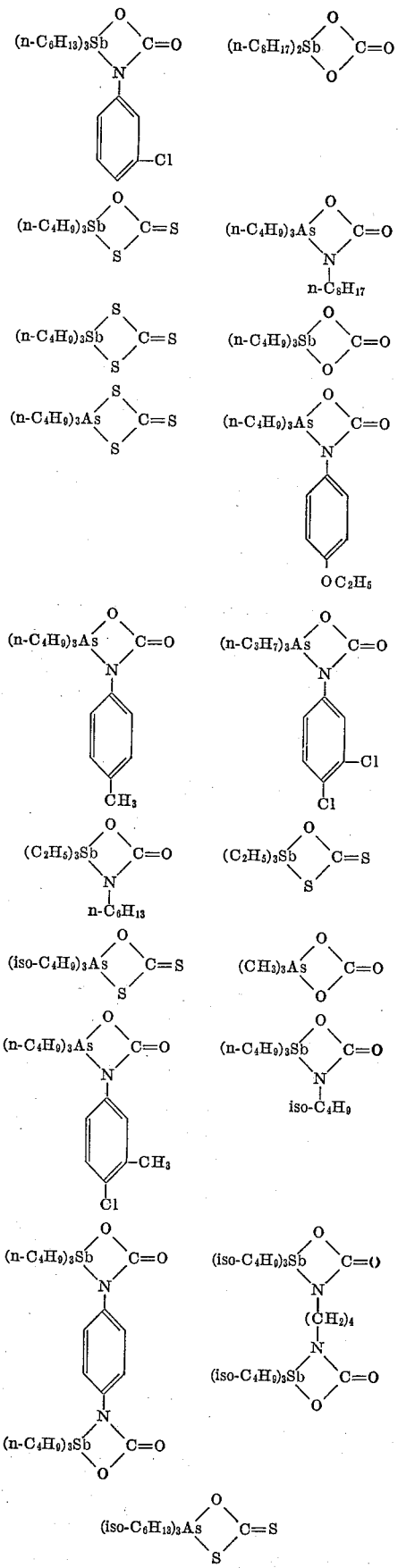

The acid anhydrides, which constitute one set of reactants used in preparing the compounds of the invention, can be regarded as the anhydride derivatives of certain hypothetical acids characterized by the presence of a single carbon atom in their acid radical. The relationship between such acids and the anhydrides thereof is shown in the following scheme:

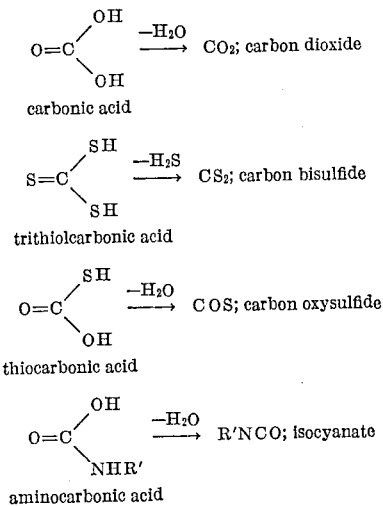

As regards the organic oxides and sulfides of Group V–A elements in the Periodic Table, these are known chemical entities, the description and preparation of which can be found in the technical literature. Such chalcogenic derivatives are commonly formed by oxidation or sulfurization of the corresponding trivalent organic compound of the particular Group V–B element, of which numerous examples are disclosed in the prior art, and in this connection reference is made to such well known periodicals as Chemical Abstracts and Berichte.

In preparing the new and novel heterocyclic compounds of the invention, we have ascertained that generally excellent results ensue by bringing together the two reactants, i.e. acid anhydride and oxide or sulfide of Group V–A element in the presence of a normally liquid organic solvent at temperatures slightly in excess of room temperature. The reaction proceeds smoothly and normally requires a few hours to run to completion. The products are for the most part obtained in the form of clear highly viscous oils. A few have been isolated as low to medium melting crystalline solids.

As above pointed out, the reaction is conveniently conducted in the presence of a normally liquid organic solvent, suitable examples of which include hydrocarbons, ethers and alcohols of the aliphatic series and liquid aromatic hydrocarbons and the chlorinated derivatives thereof. In some instances the reactants themselves may serve as the solvent provided it is a liquid or undergoes liquefaction at the conditions under which the reactions are carried out. One of the reactants that has been found particularly efficacious as a solvent medium is carbon disulfide. It is preferable to form the requisite organic sulfide of the Group V–A element in situ since this results in a more reactive intermediate than where the reactant is formed and isolated in a separate preparation. The reaction is conveniently carried out by mildly heating the intermediate trivalent organic derivative of Group V–A element with sulfur in the presence of the requisite anhydride component.

Reference is now made to the following examples which are presented for the purpose of illustration only. Various modifications of the invention will be apparent to those skilled in the art to which the said invention pertains without departing from the scope or spirit.

*Example 1*

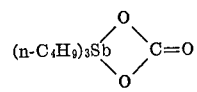

In a 100 ml. flask equipped with a magnetic stirrer, 31.5 g. (0.1 mole) of tri-n-butyl antimony oxide was dissolved in 35 cc. of diethyl ether. Carbon dioxide was then bubbled in slowly for 2 hours at room temperature. The solvent was removed at reduced pressure whereby 36.0 g. of a highly viscous, clear, non-distillable oil remained, $n_D^{20}$ 1.5141. IR data and elemental analysis confirmed the structure of the compound.

*Example 2*

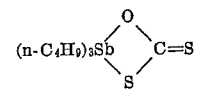

This compound was prepared in accordance with the preparation given for Example 1, except that 30.9 g. (0.1 mole) of tri-n-butylantimony oxide was contacted with 7.6 g. (0.1 mole) of carbon bisulfide with stirring for 4 hours at room temperature. The yield of product amounted to 38.5 g. and after being subjected to reduced pressure for 3 hours at room temperature showed no loss in weight. It was obtained as a clear, yellow non-distillable oil; $n_D^{26}$ 1.5430. Analytical data confirmed the proposed structure of this compound.

*Example 3*

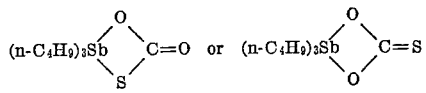

This compound was prepared in a manner similar to that of Example 1, except that 6 g. (0.1 mole) of carbon oxysulfide was bubbled into a solution of 30.9 g. (0.1 mole) of tri-n-butylantimony oxide dissolved in 50 ml. of ethanol for 2 hours at 15° C. After stripping solvent at room temperature and reduced pressure, 36.9 g. of a clear, amber, non-distillable oil was obtained; $n_D^{24}$ 1.5317. Analytical data indicated the product as having either of the above depicted structures or a mixture of both.

*Example 4*

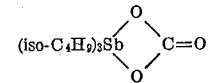

This compound was prepared in a manner similar to that in Example 1. After stripping the solvent at room temperature a non-distillable oil of $n_D^{27}$ 1.4896 was obtained the structure of which was confirmed by IR analysis.

*Example 5*

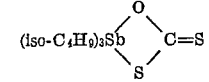

This compound was prepared in a manner similar to that of Example 2. The product, 38.5 g. (100% yield) after being subjected to reduced pressure for 3 hours at room temperature without loss in weight, was obtained as a clear dark yellow non-distillable oil; $n_D^{27}$ 1.5318. The infrared analysis was in consonance with the configuration as above shown.

*Example 6*

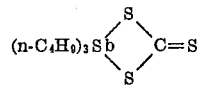

Tri-n-butylantimony (29.3 g., 0.1 mole) was dissolved in 50 ml. of carbon bisulfide in a 200 ml. flask. Then 3.2 g. (0.1 mole) sulfur dissolved in 50 ml. of carbon bisulfide was added dropwise with heating to reflux for 1 hour. After stripping all excess solvent at room temperature and reduced pressure, 32.5 g. of a dark yellow non-distillable oil was obtained at $n_D^{23}$ 1.5630 having a structure represented by the above depicted formula.

*Example 7*

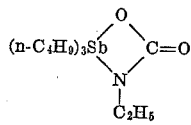

4.54 g. (0.064 mole) ethyl isocyanate dissolved in 50 ml. of moisture free benzene was added slowly to a solution of 20.0 g. (0.064 mole) of tri-n-butylantimony oxide in 50 ml. of moisture free benzene, the introduction being adjusted at such a rate that the temperature did not exceed 30°. The reaction mixture was allowed to stand overnight at room temperature after which the solvent was removed by distillation in vacuo, the temperature being maintained in the neighborhood of 0°. There was obtained in a yield of 98% a thick viscous oily product which after instrumental and elemental analysis was assigned the above depicted configuration.

By employing the procedure as above given in Example 1 the following additional compounds were prepared:

*Example 8*

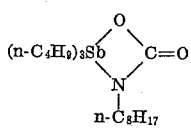

*Example 9*

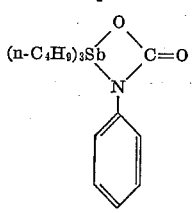

*Example 10*

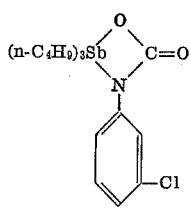

In each instance the product was obtained in the form of a yellow to brown oily liquid, which according to infrared and elemental analysis were shown to be represented by the afore depicted structural formulae.

*Example 11*

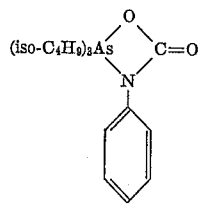

A benzene solution of 2.82 g. (0.025 mole) of phenyl isocyanate was slowly added to 6.65 g. (0.025 mole) of isobutylarsenic oxide in benzene while maintaining the reaction at 0° to 10° C. during the addition. The reaction mixture was then allowed to come to room temperature and so maintained for 2 days after which the solvent was removed by distillation in vacuo. The solid residue was subjected to purification by crystallizing from heptane. The purified product was obtained in the form of white crystals melting at 87° C. Elemental and infrared analyses indicated the structure of the product to be that as above shown.

The new and novel compounds of the invention have been found useful for various purposes. For instance, several members of this class when subjected to temperatures in the neighborhood of 50° to 60° C. undergo thermal decomposition with smooth and even release of the anhydride component from which they were formed. Thus, the compound in Example 1, when heated to 60° C. underwent thermal decomposition with a steady and smooth evolution of carbon dioxide. This property of the compounds makes them useful as blowing agents particularly in the polyurethane field where they can be used to complement or otherwise modify the physical shape and structure of the polyurethane foam. Moreover, the compounds also exhibit a pronounced biocidal actiivty and can thus be utilized in the form of pesticidal compositions.

We claim:
1. A heterocyclic compound of the following formula:

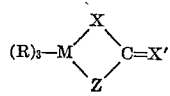

wherein M is selected from the class consisting of antimony and arsenic, R is an alkyl of from 1 to 10 carbon atoms, benzyl and phenethyl, X and X' are chalcogens selected from the class consisting of oxygen and sulphur and Z is a chalcogen as above defined for X and X' and >N—R' in which R' is selected from the class consisting of phenyl, naphthyl and alkyl groups.

2. A compound of the formula:

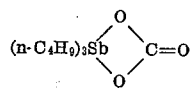

3. A compound of the formula:

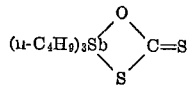

4. A compound of the formula:

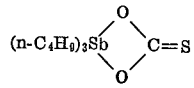

5. A compound of the formula:

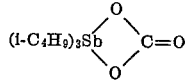

6. A compound of the formula:

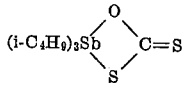

7. A compound of the formula:

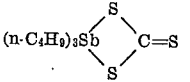

8. A compound of the formula:

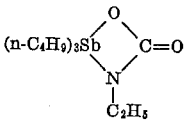

9. A compound of the formula:

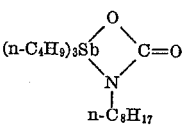

10. A compound of the formula:

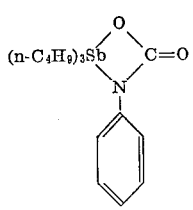

11. A compound of the formula:

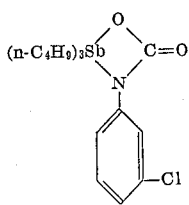

12. A compound of the formula:

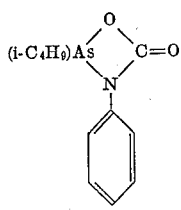

13. The method of preparing a heterocyclic compound of the following formula:

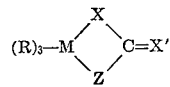

wherein M is selected from the class consisting of antimony and arsenic, R is an alkyl of from 1 to 10 carbon atoms, benzyl and phenethyl, X and X' are chalcogens selected from the class consisting of oxygen and sulfur and Z is a chalcogen as above defined for X and X' and >N—R' in which R' is selected from the class consisting of phenyl, naphthyl and alkyl groups which comprises reacting a compound selected from the class consisting of a trisubstituted organoantimony sulfide, a trisubstituted organoantimony oxide, a trisubstituted organoarsenic oxide, and a trisubstituted organoarsenic sulfide, said substituents having the value as above defined for R with an anhydride selected from the class consisting of carbon disulfide, carbon dioxide, carbon oxysulfide and an isocyanate of the formula R'NCO wherein R' has the above defined values, it being provided that the reaction be conducted at a temperature below which the heterocyclic compound undergoes thermal decomposition to release the anhydride component.

14. A compound of the formula:

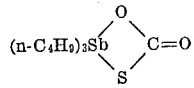

References Cited by the Examiner

Reichle: Inorganic Chemistry, vol. 1, No. 3, August 1962, pp. 650–653.

TOBIAS E. LEVOW, *Primary Examiner.*

E. C. BARTLETT, W. F. W. BELLAMY,
*Assistant Examiners.*